United States Patent
Lee et al.

(10) Patent No.: US 10,443,394 B2
(45) Date of Patent: Oct. 15, 2019

(54) BLADE, CUT-BACK OF BLADE OR VANE AND GAS TURBINE HAVING THE SAME

(71) Applicant: DOOSAN HEAVY INDUSTRIES & CONSTRUCTION CO., LTD., Changwon-si, Gyeongsangnam-do (KR)

(72) Inventors: Mu Hyoung Lee, Changwon-si (KR); Sung Chul Jung, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 15/860,659

(22) Filed: Jan. 3, 2018

(65) Prior Publication Data
US 2018/0195396 A1 Jul. 12, 2018

(30) Foreign Application Priority Data
Jan. 10, 2017 (KR) ........................ 10-2017-0003410

(51) Int. Cl.
*F01D 5/14* (2006.01)
*F01D 9/02* (2006.01)
(Continued)

(52) U.S. Cl.
CPC ............ *F01D 5/147* (2013.01); *F01D 5/187* (2013.01); *F01D 9/02* (2013.01); *F01D 9/065* (2013.01); *F01D 25/12* (2013.01); *F04D 29/324* (2013.01); *F04D 29/542* (2013.01); *F04D 29/582* (2013.01); *F02C 3/04* (2013.01); *F05D 2220/32* (2013.01); *F05D 2240/122* (2013.01);
(Continued)

(58) Field of Classification Search
CPC ............ F01D 5/147; F01D 5/187; F01D 9/02; F01D 9/065; F01D 25/12; F01D 5/18
USPC ......................................... 416/97 R; 415/115
See application file for complete search history.

(56) References Cited

U.S. PATENT DOCUMENTS 4,601,638 A * 7/1986 Hill .................... F01D 5/186
415/115
6,004,100 A * 12/1999 Przirembel ............. F01D 5/187
416/97 R
(Continued)

FOREIGN PATENT DOCUMENTS

JP  H03141801 A  6/1991
JP  H03-141801 A  9/2013

OTHER PUBLICATIONS

A Japanese Office Action dated Oct. 16, 2018 in connection with Japanese Patent Application No. 2018-000857 which corresponds to the above-referenced U.S. application.

*Primary Examiner* — Nathaniel E Wiehe
*Assistant Examiner* — Latoia L Sudler
(74) *Attorney, Agent, or Firm* — Invenstone Patent, LLC

(57) ABSTRACT

A cut-back of a blade or vane in a gas turbine may comprise a first sidewall; a plurality of trailing ribs extended from the first sidewall and arranged along an end of the first sidewall; a second sidewall separated from the first sidewall, having a longer tail than the first sidewall and in contact with the plurality of trailing ribs; and one or more cut-back blocks extended between two trailing ribs along the inner surface of the second sidewall. The cut-back of the blade or vane may reduce the weight through the trailing ribs and the cut-back blocks formed at the trailing edge, and improve a heat transfer effect while retarding crack growth.

20 Claims, 9 Drawing Sheets

(51) Int. Cl.
  *F01D 25/12*  (2006.01)
  *F04D 29/32*  (2006.01)
  *F04D 29/54*  (2006.01)
  *F04D 29/58*  (2006.01)
  *F01D 5/18*   (2006.01)
  *F01D 9/06*   (2006.01)
  *F02C 3/04*   (2006.01)

(52) U.S. Cl.
  CPC .... *F05D 2240/304* (2013.01); *F05D 2250/22* (2013.01); *F05D 2250/23* (2013.01); *F05D 2250/231* (2013.01); *F05D 2260/202* (2013.01); *F05D 2260/22141* (2013.01)

(56) References Cited

U.S. PATENT DOCUMENTS

| | | | |
|---|---|---|---|
| 7,258,528 B2 * | 8/2007 | Trindade | F01D 5/18 |
| | | | 416/224 |
| 9,790,801 B2 * | 10/2017 | Spangler | F01D 5/186 |
| 2010/0074763 A1 | 3/2010 | Liang | |
| 2013/0236330 A1 * | 9/2013 | Lee | F01D 5/182 |
| | | | 416/97 R |
| 2014/0348647 A1 * | 11/2014 | Stang | F01D 11/00 |
| | | | 415/207 |
| 2016/0186660 A1 | 6/2016 | Bergholz et al. | |
| 2016/0201476 A1 * | 7/2016 | Bunker | F01D 5/18 |
| | | | 415/115 |

* cited by examiner

[FIG. 1]
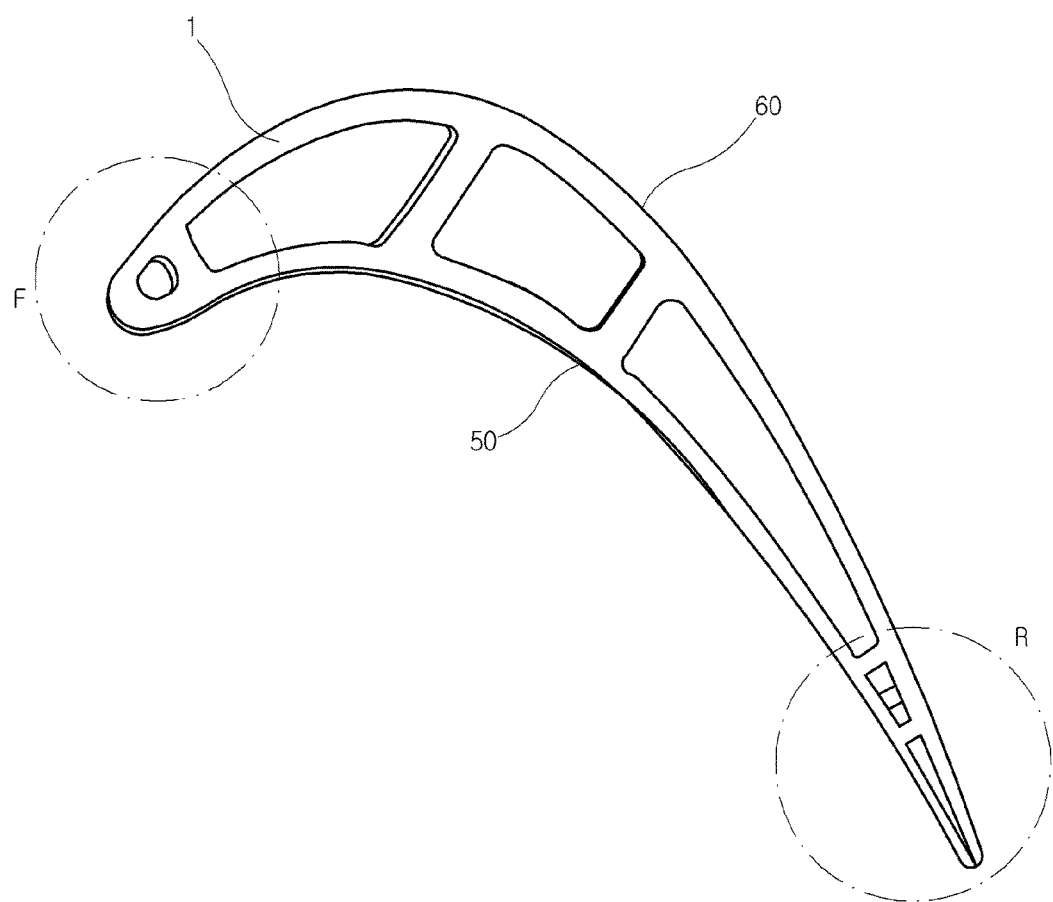

[FIG. 2]
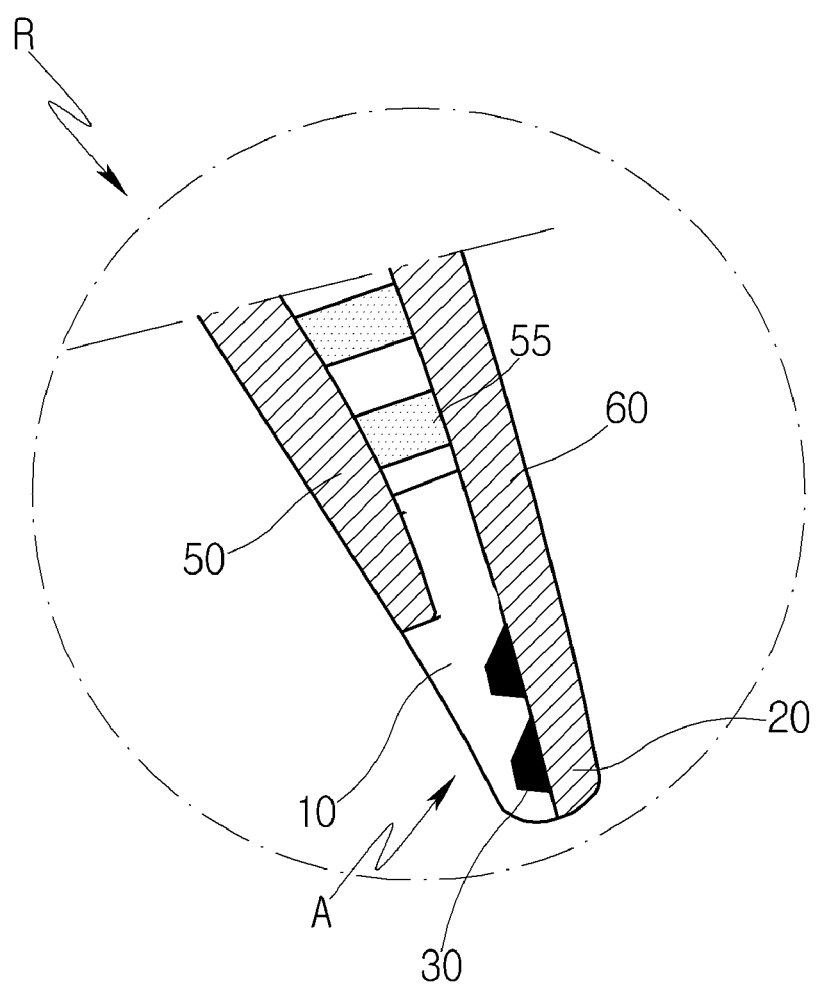

[FIG. 3]
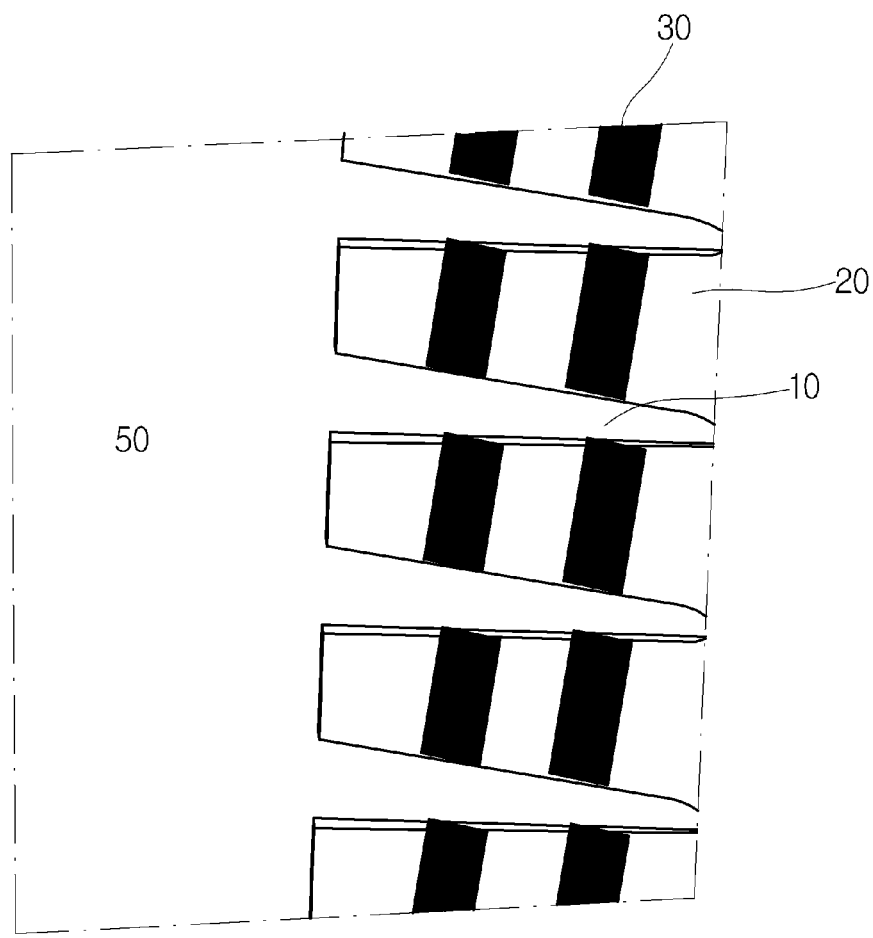

[FIG. 4]
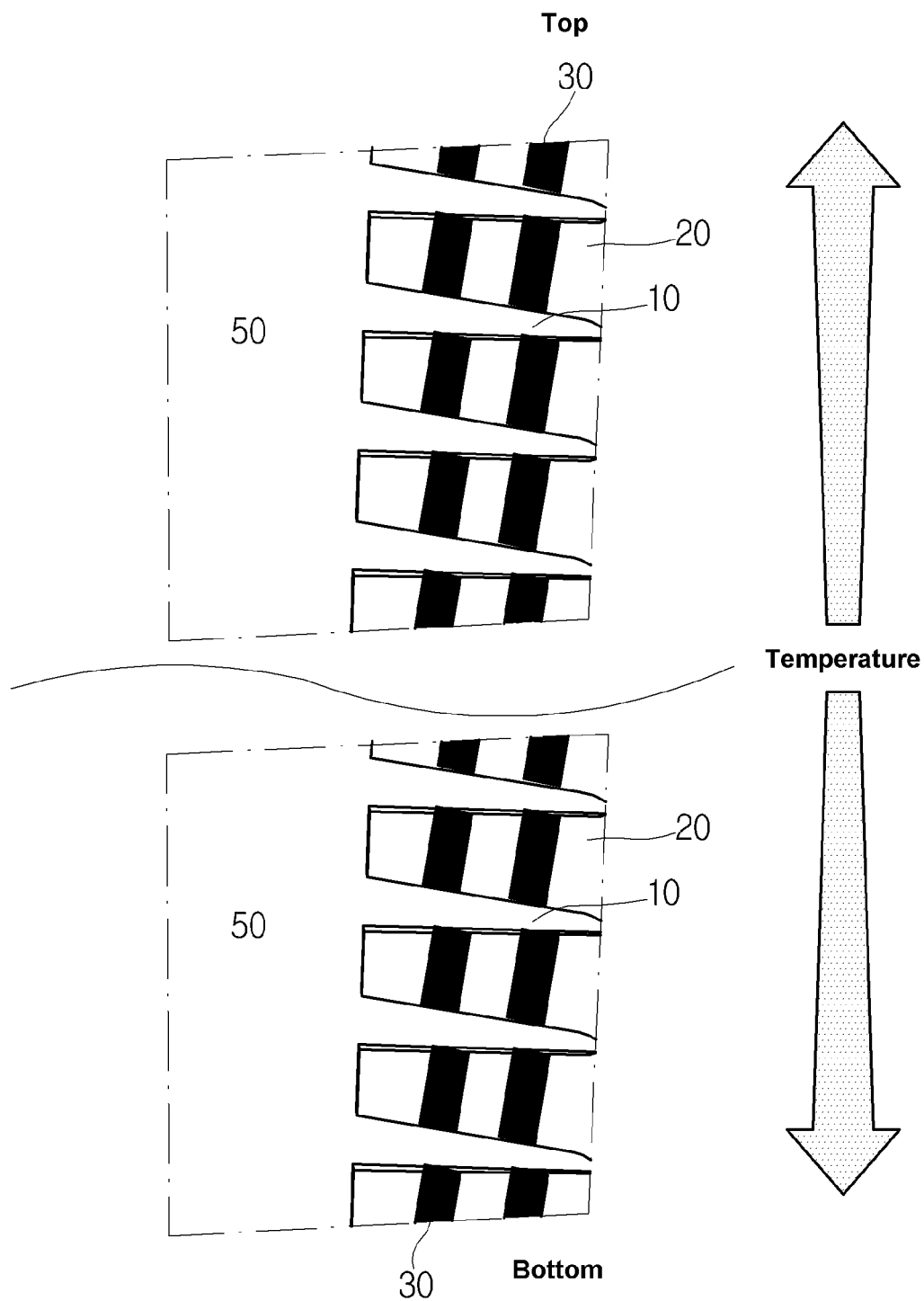

[FIG. 5]
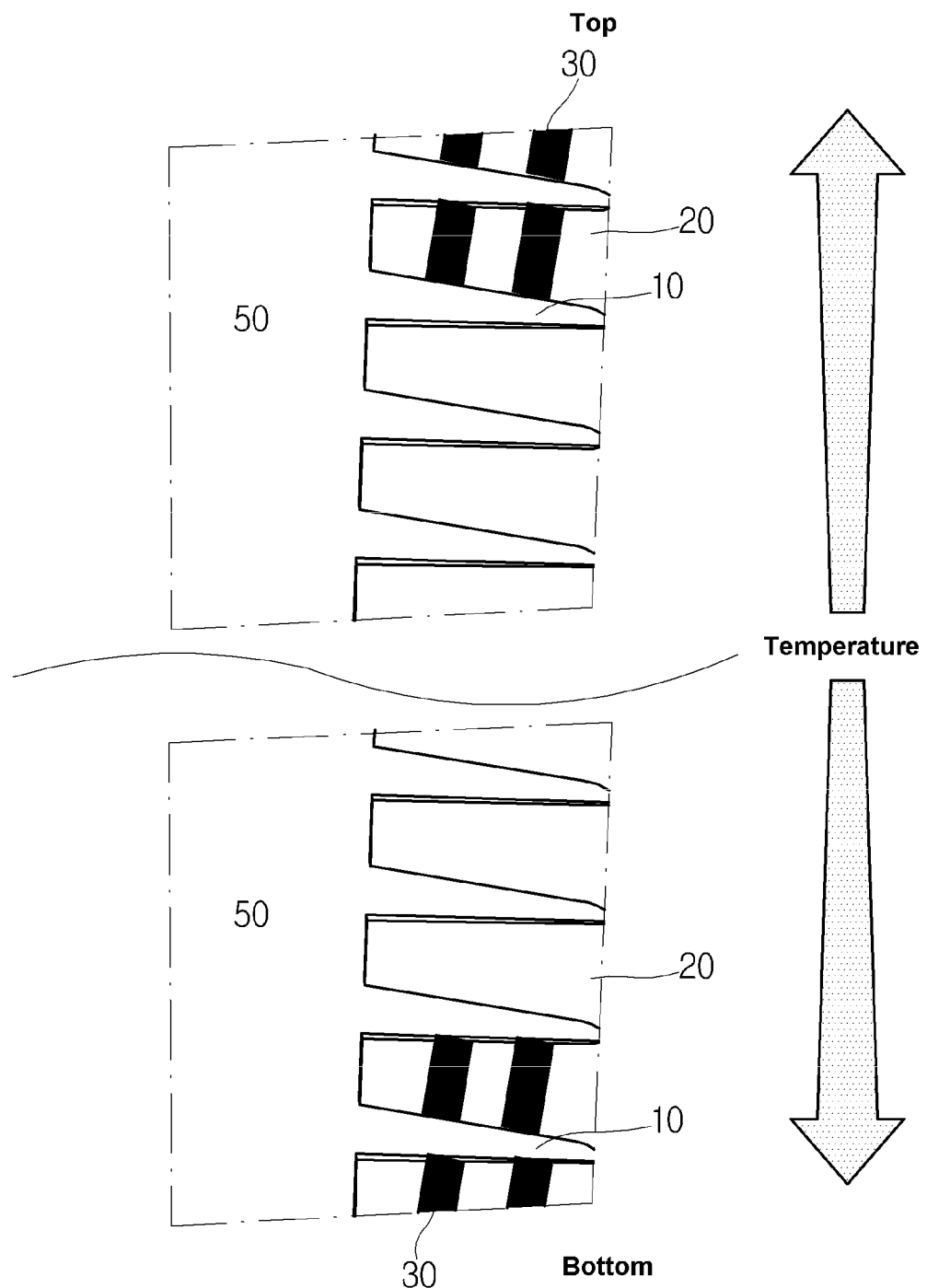

[FIG. 6]
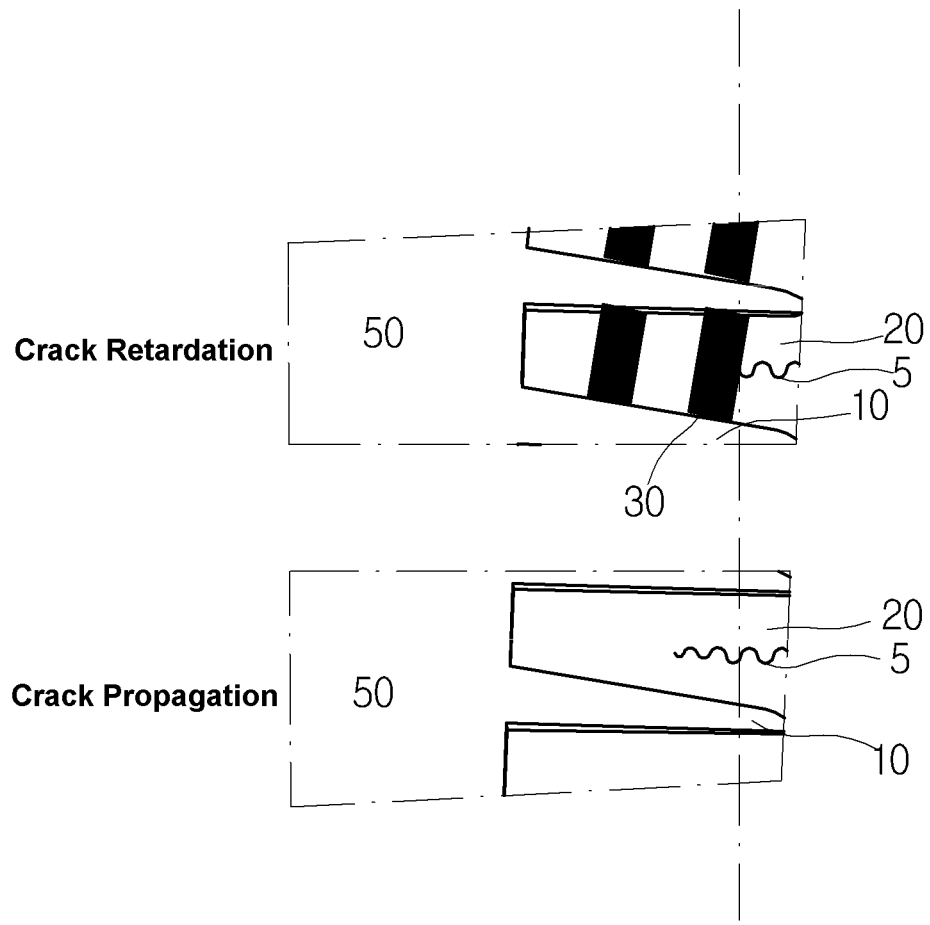

[FIG. 7]
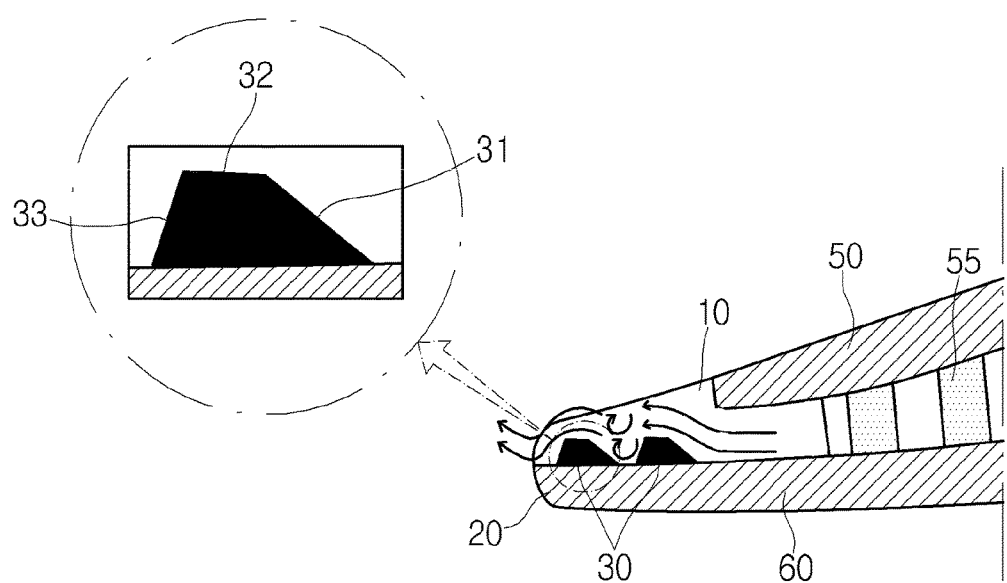

[FIG. 8]
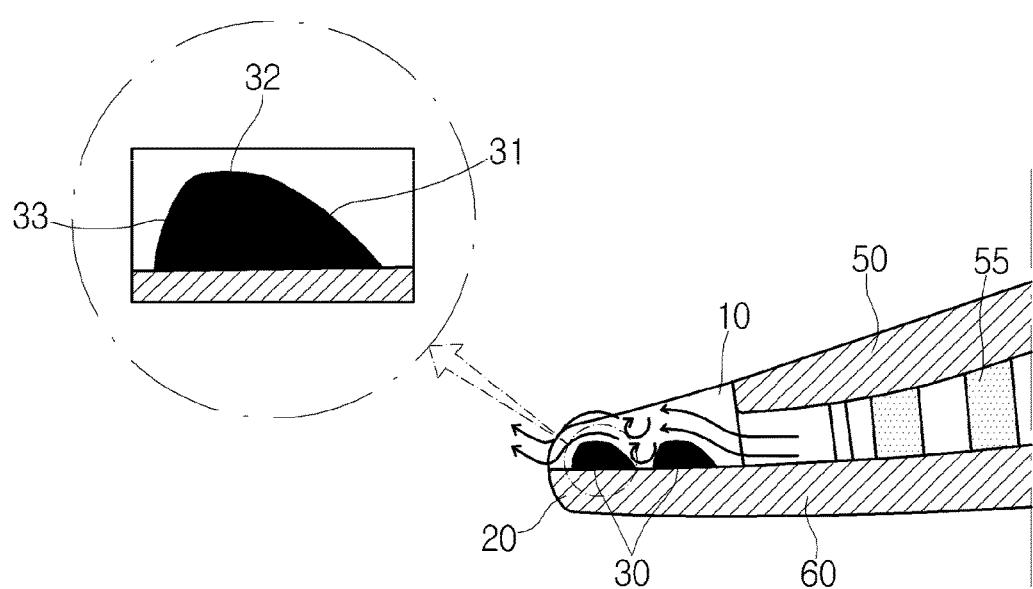

[FIG. 9]
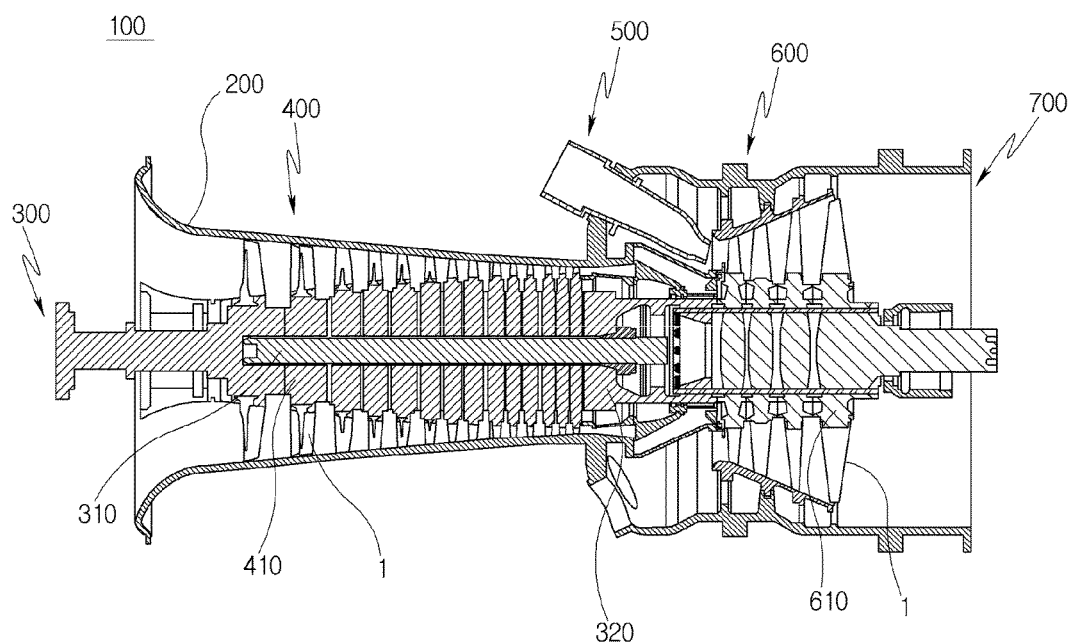

BLADE, CUT-BACK OF BLADE OR VANE AND GAS TURBINE HAVING THE SAME

CROSS-REFERENCE TO RELATED APPLICATIONS

This application claims priority to Korean Patent Application No. 10-2017-0003410, filed on Jan. 10, 2017, the disclosure of which is incorporated herein by reference in its entirety.

BACKGROUND OF THE DISCLOSURE

Field of the Disclosure

Exemplary embodiments of the present disclosure relate to a blade, a cut-back of a blade or vane and a gas turbine having the same, and more particularly, to a blade for retarding crack growth, a cut-back of a blade or vane and a gas turbine having the same.

Description of the Related Art

In general, a gas turbine comprises a compressor for compressing air, a combustor for mixing the compressed air with fuel and igniting the fuel mixture, and a turbine blade assembly for generating power.

The combustor is operated at a high temperature of more than 2,500° F. Typically, vanes and blades of the turbine are exposed to such a high temperature. Therefore, the vanes and blades of the turbine are made of a material which can withstand the high temperature. Furthermore, the vanes and blades of the turbine comprise a cooling system to reduce a damage caused by an excessively high temperature, thus increasing the lifespan of the turbine.

Each of the blades and vanes are formed in an airfoil shape, and has a leading edge, a trailing edge, a suction side and a pressure side. In general, most turbine vanes have a cooling system of a complex maze structure. A cooling circuit in the vanes holds cooling fluid from the compressor of the turbine engine. For example, air and the cooling fluid passes through an end portion of the vane coupled to a vane carrier. The blade also holds cooling fluid from the compressor of the turbine engine, and the cooling fluid passes through an end portion of the blade. The cooling circuit comprises a plurality of flow paths designed to maintain all sides at a comparatively uniform temperature, and at least a part of the fluid passing through the cooling circuit is discharged through openings of the leading edge, the trailing edge, the suction side or the pressure side of the vane. The fluid, once it is cooled off, is discharged through a cut-back of the trailing edge as well as the openings of the leading edge, the suction side or the pressure side.

The cut-back of the trailing edge has a space formed between sidewalls of the blade or vane, where the sidewalls are separated from each other while facing each other, and where the fluid is discharged through the space. For the cut-back structure according to the related art, fins are formed between the sidewalls facing each other. Accordingly, the fins might increase the weight of the apparatus, and the lifespan of the apparatus might be reduced by crack growth as well.

SUMMARY OF THE DISCLOSURE

The present disclosure has been made in view of the above problems, and it is an object of the present disclosure to provide a structure in which the length of a first sidewall positioned at a pressure side is reduced, and trailing ribs and cut-back blocks are formed in a space obtained by reducing the length of the first sidewall, in order to reduce the weight, improve a heat transfer effect, and retard a crack.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a blade of a gas turbine may comprise: a first sidewall constituting a pressure side of an airfoil; a second sidewall constituting a suction side of the airfoil, and having a longer tail than the first sidewall; a leading edge at which the first and second sidewalls meet each other; a trailing edge formed at the opposite side of the leading edge such that the first and second sidewalls are separated from each other; a pillar-shaped fin extended between the inner surfaces of the first and second sidewalls in a region of the trailing edge; and a plurality of trailing ribs formed at the tail, compared to the fin. The plurality of trailing ribs may be extended from the end of the first sidewall to the inner surface and end of the second sidewall, and separated from each other in a direction from the top to the bottom of the trailing edge.

Since the plurality of trailing ribs are separated from each other, cooling fluid can flow between the respective trailing ribs, and the weight of the blade or vain can be reduced. Furthermore, when the areas of the trailing ribs are expanded, that is, when the plurality of ribs are extended from the inner surface of the first side and the inner surface of the second sidewall to the end of the first sidewall and the end of the second sidewall, the heat transfer effect can be improved. Moreover, when the number of trailing ribs is increased, the heat transfer area can be increased.

The blade or vane may further comprise a cut-back block extended between the respective trailing ribs. The cut-back block may have a shape protruding from the inner surface of the second sidewall. At the end of the second sidewall, a crack easily occurs due to high temperature. When such a crack grows and reaches the protruding cut-back block, the crack growth is retarded.

The cut-back block may be formed at least one of between two trailing ribs at the uppermost side among the plurality of trailing ribs and between two trailing ribs at the lowermost side. That is, since the uppermost and lowermost parts of the blade or vane are most exposed to heat, the cut-back blocks may be formed at least in these parts. In consideration of the weight, no cut-back blocks may be formed in the central portion between the upper and lower portions. The cut-back block may be formed obliquely with respect to the end of the second sidewall. This is because the structure in which the cut-back block is formed obliquely with respect to the end of the second sidewall can retard crack growth more effectively than the structure in which the cut-back block is formed in parallel to the end of the second sidewall.

The blade or vane may further comprise a pair of cut-back blocks formed between two trailing ribs. When two cut-back blocks are installed, fluid discharged from the inside may cause a turbulent flow between the two cut-back blocks, and the turbulent flow may improve the heat transfer effect. The front surface of the pair of cut-back blocks may have a gentler slope than the rear surface of the pair of cut-back blocks. In this case, fluid may smoothly flow along the front surface of the cut-back block. Then, the flow direction of the fluid may be rapidly changed along the rear surface of the cut-back block through the top surface of the cut-back block, thereby increasing a turbulent flow. The front, rear and top surfaces of the pair of cut-back blocks may be formed in a curved shape.

In accordance with another aspect of the present disclosure, a cut-back of a blade or vane in a gas turbine may comprise: a first sidewall; a plurality of trailing ribs extended from the first sidewall, and arranged along an end of the first sidewall so as to be separated from each other; a second sidewall having a longer tail than the first sidewall, separated from the first sidewall, and being in contact with the plurality of trailing ribs; and one or more cut-back blocks extended between two trailing ribs along the inner surface of the second sidewall.

The one or more cut-back blocks may have a shape protruding from the inner surface of the second sidewall. The one or more cut-back blocks may be formed at least one of between two trailing ribs at the uppermost side among the plurality of trailing ribs and between two trailing ribs at the lowermost side. The one or more cut-back blocks may be formed obliquely with respect to the end of the second sidewall. A pair of cut-back blocks may be formed between two trailing ribs. The front surface of the pair of cut-back blocks may have a gentler slope than the rear surface of the pair of cut-back blocks. The front, rear and top surfaces of the pair of cut-back blocks maybe formed in a curved shape.

In accordance with still another aspect of the present disclosure, a gas turbine may comprise: a casing; a compressor section disposed at the front side of the casing, through which working fluid is introduced, and configured to compress the working fluid; a combustor disposed in the middle of the casing, connected to the compressor section, and configured to mix the compressed working fluid with fuel, and combust the fuel mixture; a turbine section disposed at the rear side of the casing, connected to the combustor, and configured to produce power using combustion gas; and a diffuser disposed at the rear end of the casing, connected to the turbine section, and configured to discharge the working fluid. A plurality of blades may be mounted on the outer circumferential surfaces of rotor disks arranged on the compressor section or the turbine section.

The gas turbine may further comprise a cut-back block extended between the respective trailing ribs. The cut-back block may have a shape protruding from the inner surface of the second sidewall. The cut-back block may be formed at least one of between two trailing ribs at the uppermost side among the plurality of trailing ribs and between two trailing ribs at the lowermost side. The cut-back block may be formed obliquely with respect to the end of the second sidewall.

According to the embodiment of the present disclosure, the trailing ribs and the cut-back blocks formed at the trailing edge can be reduced the weight, and the heat transfer effect can be improved, while crack growth is retarded.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a cross-sectional view illustrating an airfoil shape of a gas turbine blade according to an embodiment of the present disclosure;

FIG. 2 is an expanded view of a trailing edge of the gas turbine blade of FIG. 1 according to the embodiment of the present disclosure;

FIG. 3 is a side view of the trailing edge, seen from a direction A of FIG. 2;

FIG. 4 is a temperature distribution diagram illustrating temperature distributions of upper and lower portions of the trailing edge of the gas turbine of FIG. 1 according to the embodiment of the present disclosure;

FIG. 5 is a temperature distribution diagram illustrating temperature distributions of upper and lower portions of the trailing edge of the gas turbine of FIG. 1 according to the embodiment of the present disclosure;

FIG. 6 comparatively illustrates a difference in retardation of crack growth between a cut-back having cut-back blocks according to the embodiment of the present disclosure and a cut-back having no cut-back blocks;

FIG. 7 is a cross-sectional view illustrating the shape of a cut-back block and a flow of cooling fluid according to an embodiment of the present disclosure;

FIG. 8 is a cross-sectional view illustrating the shape of a cut-back block and a flow of cooling fluid according to an embodiment of the present disclosure; and FIG. 9 illustrates a general structure of a gas turbine.

DESCRIPTION OF SPECIFIC EMBODIMENTS

Hereafter, a blade or vane of a gas turbine according to an embodiment of the present disclosure will be described in detail with reference to the accompanying drawings. The structure of a trailing edge or cut-back according to an embodiment of the present disclosure can be applied to both of the blade and vane. In the following descriptions, however, only the blade will be exemplified for convenience of description.

First, a general structure of a gas turbine to which an embodiment of the present disclosure may be applied will be described with reference to FIG. 9, before embodiments of the present disclosure are described. Referring to FIG. 9, the gas turbine comprises a casing 200 forming the exterior of the gas turbine, a compressor section 400 for compressing air, a combustor 500 for combusting air, a turbine section 600 for generating power using the combusted air, a diffuser 700 for discharging exhaust gas, and a rotor 300 connecting the compressor section 400 and the turbine section 600 to transfer rotation power.

Thermodynamically, external air is introduced into the compressor section 400 corresponding to the upstream side of the gas turbine, and then adiabatically compressed. The compressed air is introduced into the combustor 500, mixed with fuel, and subjected to isobaric combustion. The combustion gas is introduced into the turbine section 600 corresponding to the downstream side of the gas turbine, and adiabatically expanded. Based on the flow direction of the air, the compressor section 400 is positioned at the front side of the casing 200, and the turbine section 600 is positioned at the rear side of the casing 200. Between the compressor section 400 and the turbine section 600, a torque tube 320 is installed to transfer a torque generated by the turbine section 600 to the compressor section 400.

The compressor section 400 comprises a plurality of compressor rotor disks 410 (for example, 14 compressor rotor disks), and the compressor rotor disks 410 are fastened by a tie rod 310 in the axial direction. The compressor rotor disks 410 are aligned along the axial direction with the tie rod 310 provided through the centers of the compressor rotor disks 410. Each of the compressor rotor disks 410 has a flange formed around the outer circumference thereof, where the flange protrudes in the axial direction. The flange of the compressor rotor disk 410 is coupled to a neighboring rotor disk such that the rotor disks cannot be rotated relative to each other. The compressor rotor disk 410 has a plurality of blades 1 (also referred to as buckets) radially coupled to the outer circumferential surface thereof. Each of the blades 1 is fastened to the compressor rotor disk 410 through a dove tail part (not illustrated) formed thereon. The fastening method for the dove tail part is divided into a tangential type and an axial type. The fastening method may be selected according to the structure of a commercially used gas turbine. In some cases, the compressor blades 1 may be fastened to the compressor rotor disk 410 through another fastening mechanism in place of the dove tail structure. At this time, vanes (not illustrated) for relative rotary motions of the compressor blades 1 may be mounted and arranged on a diaphragm at the inner circumferential surface of the compressor section 400 of the casing 200. The vane may also be referred to as a nozzle.

The tie rod 310 is disposed through the centers of the plurality of compressor rotor disks 410. One end of the tie rod 310 is fastened to the compressor rotor disks 410 positioned at the most upstream side, and the other end of the tie rod 310 is fixed to the torque tube 320. Since the tie rod 310 may have various structures depending on the gas turbine, the tie rod 310 is not limited to the shape illustrated in the drawing. Specifically, one of the tie rods 310 may be disposed through the centers of the compressor rotor disks 410, a plurality of the tie rods 310 may be arranged along the circumference of the gas turbine, and both of the structures may be used together.

Although not illustrated, the compressor of the gas turbine may comprise a guide vane installed next to the diffuser 700 in order to adjust a flow angle of fluid to a designed flow angle, where the fluid is introduced into the entrance of the combustor 500 after the pressure of the fluid is raised. The combustor 500 combusts fuel mixed with the introduced compressed air to produce high-temperature, high-pressure and high-energy combustion gas. The temperature of the combustion gas is raised through the isobaric combustion process to the heat-resistant limit at which the parts of the combustor 500 and the turbine section 600 can withstand. The combustion system of the gas turbine may comprise a plurality of the combustors 500 of a cell shape arranged in the casing 200. The combustor 500 comprises a burner having a fuel injection nozzle, a combustor liner forming a combustion chamber, and a transition piece serving as a connection part between the combustor 500 and the turbine section 600.

Specifically, the combustor liner or the liner provides a combustion space in which fuel injected by the fuel nozzle is mixed with the compressed air of the compressor section 400 and then combusted. The liner may comprise a flame tube which provides the combustion space where the fuel mixed with the air is combusted as well as a flow sleeve which surrounds the flame tube and forms a ring-shaped space. Furthermore, a fuel nozzle is coupled to the front end of the liner, and an ignition plug is coupled to the sidewall of the liner. The transition piece is connected to the rear end of the liner so as to transfer combustion gas generated by the ignition plug toward the turbine section 600.

The outer wall of the transition piece is cooled by the compressed air supplied from the compressor section 400, which makes it possible to prevent a damage caused by the high-temperature combustion gas. For this operation, the transition piece has holes for injecting air to the inside thereof, and the compressed air cools the main body in the transition piece through the holes and then flows toward the liner. The cooling air, having cooled the transition piece, flows through the ring-shaped space of the liner, and the compressed air may be provided as cooling air from outside the flow sleeve through cooling holes formed at the flow sleeve, and collides with the outer wall of the liner.

In the turbine section 600, the high-temperature high-pressure combustion gas from the combustor 500 is expanded and converted into mechanical energy by an impulsive force and reaction force with the rotating blades of the turbine section 600. A part of the mechanical energy obtained through the turbine section 600 is supplied as energy required for compressing air through the compressor section 400, and the other part is used for driving a generator to generate power.

The turbine section 600 comprises a plurality of stator vanes and rotor vanes which are alternately arranged in a chamber, and drives the rotor vanes using combustion gas, thereby rotating an output shaft connected to the generator. For this operation, the turbine section 600 comprises a plurality of the turbine rotor disks 610. Each of the turbine rotor disks 610 basically has a similar shape to the compressor rotor disks 410.

The turbine rotor disks 610 also has a flange (not illustrated) coupled to a neighboring turbine rotor disk, and comprises a plurality of the turbine blades 1 arranged in a radial shape. The turbine blades are also referred to as turbine buckets. The turbine blade 1 may also be coupled to the turbine rotor disks 610 through a dove tail structure. At this time, vanes (not illustrated) for relative rotary motions of the turbine blades 1 may be mounted and arranged on a diaphragm (not illustrated) at the inner circumferential surface of the turbine section 600 of the casing 200. The vanes are also referred to as nozzles. Within the gas turbine having the above-described structure, the introduced air is compressed by the compressor section 400, combusted in the combustor 500, transferred to the turbine section 600 to generate power, and then discharged to the atmosphere through the diffuser 700. The torque tube 320, the compressor rotor disks 410, the compressor blades 1, the turbine rotor disks 610, the turbine blades 1 and the tie rod 310, which are rotational components, may be collectively referred to as the rotor 300 or a rotating body. The casing 200, the vanes (not illustrated) and the diaphragm (not illustrated), which are irrotational components, may be collectively referred to as a stator or fixed body.

A general example of the gas turbine may be of the structure as illustrated in FIG. 9. Hereafter, an embodiment of the present disclosure which is applied to the gas turbine will be described.

FIG. 1 is a cross-sectional view illustrating an airfoil shape of a gas turbine blade 1 according to an embodiment of the present disclosure. Referring to FIGS. 1 and 2, first and second sidewalls 50 and 60 of a curved shape are separated from each other with a space provided there between, and meet each other at one side to form a leading edge F. The two sidewalls 50 and 60 are extended toward the opposite side such that the space between the sidewalls 50 and 60 is gradually narrowed to form a trailing edge R, and a cut-back is formed at the trailing edge R so as to discharge residual cooling fluid. The first sidewall 50 is formed in a concave shape when seen from outside, and the outer surface of the first sidewall 50 is set to a pressure side. The second sidewall 60 is formed in a convex shape when seen from outside, and the outer surface of the second sidewall 60 is set to a suction side.

FIG. 2 is an expanded view of the trailing edge R illustrated in FIG. 1. The first sidewall 50 has a smaller length than the second sidewall 60. Between the first and second sidewalls 50 and 60, pillar-shaped fins 55 are formed to raise a heat transfer effect while providing a path for discharged fluid. The fins 55 are extended from the inner surface of the first sidewall 50 to the inner surface of the second sidewall 60.

A plurality of trailing ribs 10 are positioned at the downstream side of the fins, such that the first and second sidewalls 50 and 60 are connected at the trailing edge. The trailing ribs 10 are extended in a plate shape, for example, first between the two sidewalls 50 and 60 and then along first sidewall 50 only, to guide the discharged air. The trailing ribs 10 are extended from the end of the first sidewall 50 to the end of the inner surface of the second sidewall 60 in the direction that the outer surface of the first sidewall 50 is extended toward the trailing edge. That is, as illustrated in FIG. 2, seen from the top, the trailing ribs 10 are formed in such a manner that the outer boundary of the trailing edge is not disconnected but is smoothly connected. Two cut-back blocks 30 are formed at the position where the trailing ribs 10 are formed. The two cut-back blocks 30 have a shape protruding from the inner surface of the second sidewall 60.

FIG. 3 is a side view of the trailing edge, seen from a direction A of FIG. 2.

As illustrated in FIG. 3, the trailing ribs 10 are extended from the end of the first sidewall 50 toward the tail 20. The discharged fluid flows from the end of the first sidewall 50 toward the tail, and exchanges heat through a contact with inclined surfaces of the trailing ribs 10 or the tail 20 of the second sidewall 60 while escaping from the trailing edge.

The widths of the trailing ribs 10 may be decreased toward the tail from the positions at which the trailing ribs 10 meet the end of the first sidewall 50. Such a structure not only secures the surface area of the blade, but also expands the flow path of discharged fluid. Thus, the pressure gets lowered significantly while the temperature is slightly lowered. The cut-back blocks 30 are obliquely extended between the two trailing ribs 10.

FIGS. 4 and 5 are temperature distribution diagrams illustrating temperature distributions of upper and lower portions of the trailing edge in the gas turbine according to the embodiment of the present disclosure. FIG. 4 illustrates that two cut-back blocks 30 are obliquely extended between the respective trailing ribs 10. Since the trailing ribs 10 serve to connect and integrate the first and second sidewalls 50 and 60 at the trailing edge, the trailing ribs 10 need to be uniformly distributed from the top to the bottom of the blade. However, the cut-back blocks 30 may be designed to be preferentially formed at the top and bottom of the blade. This is because each portion of the blade is exposed to heat at a different frequency, and the chance of developing a crack may be the highest at the upper or lower portion of the trailing edge.

For example, as indicated by temperature distribution arrows of FIGS. 4 and 5, the uppermost and lowermost parts of the blade 1 are exposed to heat the most due to the characteristic of the blade 1. Since the trailing edge of the blade has a smaller thickness than the leading edge or the center thereof and is exposed to heat at a higher frequency than the leading edge or the center thereof, a crack is highly likely to occur from the trailing edge. Such a crack tends to gradually grow toward the leading edge, and the crack growth is one of main factors that reduce the lifespan of the blade. Therefore, as illustrated in FIG. 5, the cut-back blocks 30 may not be formed in the central portion, but formed only in the upper and lower portions of the trailing edge, thus making it possible to reduce the weight.

FIG. 6 comparatively illustrates a difference in the retardation of crack growth between the cut-back having cut-back blocks according to the embodiment of the present disclosure and a cut-back having no cut-back blocks. In the cut-back indicated by "crack retardation" in FIG. 6, a crack 5 advancing from the tail meets one of the cut-back blocks 30. Thus, the growth speed of the crack 5 is significantly decreased. In the cut-back indicated by "crack propagation", however, the crack 5 advancing from the tail continuously grows at the tail 20 of the second sidewall 60 without an obstacle. The crack 5 growing toward the front may weaken the durability of the blade 1.

The cut-back blocks 30 of the cut-back according to the present embodiment may be designed to extend in parallel to the boundary line of the tail end, which is extended from top to bottom. As illustrated in FIGS. 3 to 6, however, the cut-back blocks 30 may be designed to extend obliquely with respect to the bounding line. This is because the structure in which the cut-back blocks 30 extend obliquely with respect to the boundary line of the tail end may prevent the crack growth more effectively than the structure in which the cut-back blocks 30 extend in parallel to the boundary line of the tail end. That is, the direction of the crack is smoothly bent along the oblique cut-back blocks 30, and the crack growth is retarded.

FIGS. 7 and 8 are cross-sectional views illustrating the shapes of cut-back blocks and flows of cooling fluid according to embodiments of the present disclosure. The discharged fluid flows from the leading edge corresponding to the right side of FIG. 7 toward the tail 20 of the second sidewall 60. Such a fluid flow is indicated by arrows in FIG. 7.

Only one cut-back block 30 may be formed in each space or between two trailing ribs 10. As illustrated in FIGS. 7 and 8, however, a plurality of cut-back blocks 30 may be formed. The cut-back block 30 may comprise a front surface 31 having a gentle slope, a top surface 32 parallel to the inner surface of the tail 20, and a rear surface 33 having a steep slope at the opposite side of the front surface 31. Cooling fluid coming up on the top surface 32 along the front surface 31 causes a turbulent flow while flowing along the rear surface 33 having the steep slope. Such a turbulent flow exchanges heat with the tail 20 or the cut-back block 30 once more, thereby increasing the efficiency of heat exchange.

FIG. 8 illustrates the cut-back block 30 formed in a convex shape as a whole, because the front surface 31, the top surface 32 and the rear surface 33 are formed in a curved shape. Such a structure reduces friction between cooling fluid and the cut-back block 30, thereby discharging the cooling fluid more smoothly.

In the cut-back of the blade of the gas turbine according to the embodiment of the present disclosure, the cut-back block 30 formed between the trailing ribs 10 may retard crack growth, secure a surface area and cause a turbulent flow that increases the efficiency of heat exchange.

The gas turbine according to the embodiment of the present disclosure may comprise the casing 200, the compressor section 400, the combustor 500, the turbine section 600 and the diffuser 700. The compressor section 400, disposed at the front side of the casing 200 into which working fluid is introduced, compresses the working fluid. The combustor 500, disposed in the middle of the casing 200 and connected to the compressor section 400, mixes the compressed working fluid with fuel, and combusts the fuel mixture. The turbine section 600, disposed at the rear side of the casing 200 and connected to the combustor 500, generates power using the combustion gas. The diffuser 700, disposed at the rear end of the casing 200 connected to the turbine section 600, discharges the working fluid. Each of the rotor disks 410 and 610 arranged on the compressor section 400 or the turbine section 600 may have the plurality of blades 1 mounted on the outer circumferential surface thereof.

As described above, the blade 1 may further comprise the cut-back blocks 30 extended between the respective trailing ribs 10. The cut-back block 30 may have a shape protruding from the inner surface of the second sidewall 60, and be formed between two trailing ribs at the uppermost location of the plurality of trailing ribs 10 or between two trailing ribs at the lowermost location of the plurality of trailing ribs 10. The cut-back block 30 may be formed obliquely with respect to the end portion of the second sidewall 60, and a pair of cut-back blocks may be formed between the two trailing ribs. The front surface of the pair of cut-back blocks 30 may have a gentler slope than the rear surface thereof, and the front, rear and top surfaces of the pair of cut-back blocks may be formed in a curved shape.

While the present disclosure has been described with respect to the specific embodiments, it will be apparent to those skilled in the art that various changes and modifications may be made without departing from the spirit and scope of the disclosure as defined in the following claims.

What is claimed is:

1. A blade of a gas turbine, comprising:
   a first sidewall constituting a pressure side of an airfoil having a leading edge and a trailing edge;
   a second sidewall opposing the first sidewall and constituting a suction side of the airfoil, the second sidewall having a tail that is longer than a tail of the first sidewall such that a tail end of the first sidewall is separated from a tail end of the second sidewall in a direction of a chord line of the airfoil;
   a plurality of trailing ribs that are arranged along the trailing edge and that extend from the tail end of the first sidewall to the tail end of the second sidewall; and
   a plurality of cut-back blocks each of which extends from a first inner wall of one of a pair of adjacent trailing ribs among the plurality of trailing ribs to a second inner wall of the other of the pair of adjacent trailing ribs and is disposed obliquely with respect to the tail end of the second sidewall.

2. The blade of claim 1, wherein each cut-back block of the plurality of cut-back blocks includes a pair of parallel cut-back block members respectively extending between the first and second inner walls.

3. The blade of claim 2, wherein the each of the pair of parallel cut-back block members has a shape protruding from an inner surface of the tail of the second sidewall.

4. The blade of claim 3, wherein the shape includes a front surface and a rear surface, the front surface having a gentler slope than the rear surface.

5. The blade of claim 4, wherein the front and rear surfaces are flat.

6. The blade of claim 5, wherein the shape further includes a top surface that is parallel to the inner surface of the tail of the second sidewall.

7. The blade of claim 4, wherein the front and rear surfaces are curved.

8. The blade of claim 7, wherein the shape further includes a curved top surface.

9. The blade of claim 1, wherein the plurality of trailing ribs further extend from an inner surface of the tail of the first sidewall to an inner surface of the tail of the second sidewall.

10. The blade of claim 1, further comprising a pillar-shaped fin extended between the inner surface of the tail of the first sidewall and the inner surface of the tail of the second sidewall.

11. The blade of claim 1, wherein each of the plurality of trailing ribs has a width that gradually decreases from the tail end of the first sidewall to the tail end of the second sidewall.

12. The blade of claim 1, wherein the plurality of trailing ribs are spaced apart from each other at regular intervals extending between a top and a bottom of the trailing edge.

13. The blade of claim 12,
   wherein the adjacent trailing ribs include at least one upper pair of adjacent trailing ribs arranged at the top of the trailing edge and central adjacent trailing ribs arranged in a central portion of the trailing edge between the top and the bottom of the trailing edge,
   wherein the plurality of cut-back blocks include upper cut-back blocks disposed between the at least one upper pair of adjacent trailing ribs, and
   wherein there are no cut-back blocks disposed between any of the central adjacent trailing ribs.

14. The blade of claim 12,
   wherein the adjacent trailing ribs include at least one lower pair of adjacent trailing ribs arranged at the bottom of the trailing edge and central adjacent trailing ribs arranged in a central portion of the trailing edge between the top and the bottom of the trailing edge,
   wherein the plurality of cut-back blocks include lower cut-back blocks disposed between the at least one lower pair of adjacent trailing ribs, and
   wherein there are no cut-back blocks disposed between any of the central adjacent trailing ribs.

15. The blade of claim 1, wherein the trailing edge of the airfoil is formed by a continuous surface including an outer surface of the tail of the first sidewall, an outer surface of the plurality of trailing ribs, the tail end of the second sidewall, and an outer surface of the tail of the second sidewall.

16. The blade of claim 1, wherein the tail end of the first sidewall is separated from the tail end of the second sidewall by a distance that is greater than a height of any one of the plurality of cut-back blocks.

17. A cut-back of a blade in a gas turbine, the cut-back comprising:
   a first sidewall;
   a second sidewall opposing the first sidewall and having a tail that is longer than and separated from a tail of the first sidewall;
   a plurality of trailing ribs that are spaced apart from each other at regular intervals along a trailing edge of the blade and that extend from the tail end of the first sidewall to the tail end of the second sidewall; and
   a plurality of cut-back blocks each of which extends from a first inner wall of one of a pair of adjacent trailing ribs among the plurality of trailing ribs to a second inner wall of the other of the pair of adjacent trailing ribs and is disposed obliquely with respect to the tail end of the second sidewall.

18. The cut-back of claim 17, wherein each cut-back block of the plurality of cut-back blocks includes a pair of cut-back block members respectively extending between the first and second inner walls, and the cut-back block members are parallel to each other such that each cut-back block member is disposed obliquely with respect to the tail end of the second sidewall.

19. A gas turbine comprising:
- a compressor section configured to compress working fluid, the compressor section including a rotor disk having an outer circumferential surface of which a compressor blade is mounted;
- a combustor configured to produce combustion gas by mixing the compressed working fluid with fuel and combusting the mixture; and
- a turbine section configured to produce power using the combustion gas, the turbine section including a rotor disk having an outer circumferential surface of which a turbine blade is mounted,
- wherein at least one of the compressor blade and the turbine blade comprises:
  - a first sidewall constituting a pressure side of an airfoil having a leading edge and a trailing edge;
  - a second sidewall opposing the first sidewall and constituting a suction side of the airfoil, the second sidewall having a tail that is longer than a tail of the first sidewall such that a tail end of the first sidewall is separated from a tail end of the second sidewall in a direction of a chord line of the airfoil;
  - a plurality of trailing ribs that are arranged along the trailing edge and that extend from the tail end of the first sidewall to the tail end of the second sidewall; and
  - a plurality of cut-back blocks each of which extends from a first inner wall of one of a pair of adjacent trailing ribs among the plurality of trailing ribs to a second inner wall of the other of the pair of adjacent trailing ribs and is disposed obliquely with respect to the tail end of the second sidewall.

20. The gas turbine of claim 19, wherein each cut-back block of the plurality of cut-back blocks includes a pair of cut-back block members respectively extending between the first and second inner walls, and the cut-back block members are parallel to each other such that each cut-back block member is disposed obliquely with respect to the tail end of the second sidewall.

* * * * *